United States Patent
Eck et al.

(10) Patent No.: US 7,231,361 B2
(45) Date of Patent: Jun. 12, 2007

(54) METHOD, SYSTEM, AND STORAGE MEDIUM FOR UTILIZING EXCESS AND SURPLUS INVENTORY

(75) Inventors: Brian T. Eck, Poughquag, NY (US); Anthony V. Ferreri, Hyde Park, NY (US); Barun Gupta, Shelton, CT (US); George W. Reiche, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 10/134,165

(22) Filed: Apr. 29, 2002

(65) Prior Publication Data
US 2003/0204455 A1    Oct. 30, 2003

(51) Int. Cl.
*A01K 5/02* (2006.01)
(52) U.S. Cl. .......................... 705/29; 705/28
(58) Field of Classification Search .............. 705/29, 705/28, 22, 10
See application file for complete search history.

(56) References Cited

U.S. PATENT DOCUMENTS

| | | | |
|---|---|---|---|
| 4,646,238 A | 2/1987 | Carlson, Jr. et al. | 364/403 |
| 4,664,294 A | 5/1987 | Hetherington | 222/105 |
| 5,128,861 A | 7/1992 | Kagami et al. | 364/403 |
| 5,237,496 A | 8/1993 | Kagami et al. | 364/401 |
| 5,287,267 A | 2/1994 | Jayaraman et al. | 364/403 |
| 5,548,518 A * | 8/1996 | Dietrich et al. | 700/100 |
| 5,630,070 A | 5/1997 | Dietrich et al. | 395/208 |
| 5,699,259 A | 12/1997 | Colman et al. | 364/468.05 |
| 5,712,989 A | 1/1998 | Johnson et al. | 395/228 |
| 5,765,143 A | 6/1998 | Sheldon et al. | 705/28 |
| 5,884,300 A | 3/1999 | Brockman | 707/2 |
| 5,946,662 A | 8/1999 | Ettl et al. | 705/8 |
| 5,960,414 A | 9/1999 | Rand et al. | 705/28 |
| 5,963,919 A | 10/1999 | Brinkley et al. | 705/28 |
| 5,970,465 A | 10/1999 | Dietrich et al. | 705/7 |
| 6,006,192 A | 12/1999 | Cheng et al. | 705/7 |
| 6,014,633 A | 1/2000 | DeBusk et al. | 705/7 |
| 6,049,742 A | 4/2000 | Milne et al. | 700/99 |
| 6,119,102 A | 9/2000 | Rush et al. | 705/29 |
| 6,151,582 A * | 11/2000 | Huang et al. | 705/8 |
| 6,253,187 B1 | 6/2001 | Fox | 705/10 |
| 6,260,047 B1 | 7/2001 | Fox et al. | 707/104 |
| 6,341,271 B1 | 1/2002 | Saivo et al. | 705/28 |
| 6,681,141 B2 * | 1/2004 | Ferreri et al. | 700/106 |
| 2002/0174000 A1 * | 11/2002 | Katz et al. | 705/7 |
| 2002/0178077 A1 * | 11/2002 | Katz et al. | 705/26 |
| 2003/0033179 A1 * | 2/2003 | Katz et al. | 705/7 |

* cited by examiner

*Primary Examiner*—Ronald Laneau
(74) *Attorney, Agent, or Firm*—Cantor Colburn LLP

(57) ABSTRACT

An exemplary embodiment of the invention relates to a method, system, and storage medium for utilizing excess inventory of parts used in end products and having part numbers. The method comprises: determining a summary of at least one end product utilizing at least one excess part number, wherein the summary includes a total quantity of the at least one excess part number required to produce a respective end product; and based on a selection of at least one end product from the summary and at least one corresponding quantity, generating a report of end products that, for each quantity of end products, lists the dollar value of excess parts consumed to produce the quantity of end product; and the dollar value of additional parts to be purchased to produce the quantity of end product. The invention also includes a system and storage medium.

17 Claims, 2 Drawing Sheets

US 7,231,361 B2

METHOD, SYSTEM, AND STORAGE MEDIUM FOR UTILIZING EXCESS AND SURPLUS INVENTORY

FIELD OF THE INVENTION

The present invention relates generally to inventory management. More particularly, the present invention relates to a method, system, and storage medium for utilizing excess and/or surplus inventory in a manufacturing environment.

BACKGROUND OF THE INVENTION

Surplus inventory (e.g., parts that have inventory but no demand) and excess inventory (e.g., parts that have inventory but no current demand) can be problematic for manufacturers as they can cause increased costs and reduced profits. Inventory specialists are individuals responsible for finding new and innovative ways to reduce inventory levels. Tools for shortening the supply chain pipeline and reducing lead times have been the focus of many of these specialists. One attempt at solving the surplus/excess inventory problem involves the development of a build plan for end products that would consume as many of these surplus/excess parts as possible. The build decision has been solved in the past in a manual fashion by investigating individual choices one at a time. Not only is this labor intensive, but when excess parts could be used on several alternative end items, each of which might consume various quantities of other excess parts, the problem becomes too complex for the manual approach.

What is needed is a method of assessing and evaluating an optimal build plan for end products that will consume surplus/excess parts held in inventory with minimal additional purchase requirements.

SUMMARY OF THE INVENTION

An exemplary embodiment of the invention relates to a method, system, and storage medium for utilizing excess inventory of parts used in end products and having part numbers. The method comprises: determining a summary of at least one end product utilizing at least one excess part number, wherein the summary includes a total quantity of the at least one excess part number required to produce a respective end product; and based on a selection of at least one end product from the summary and at least one corresponding quantity, generating a report of end products that, for each quantity of end products, lists the dollar value of excess parts consumed to produce the quantity of end product; and the dollar value of additional parts to be purchased to produce the quantity of end product. The invention also includes a system and storage medium.

DETAILED DESCRIPTION OF THE INVENTION

Figure 1:
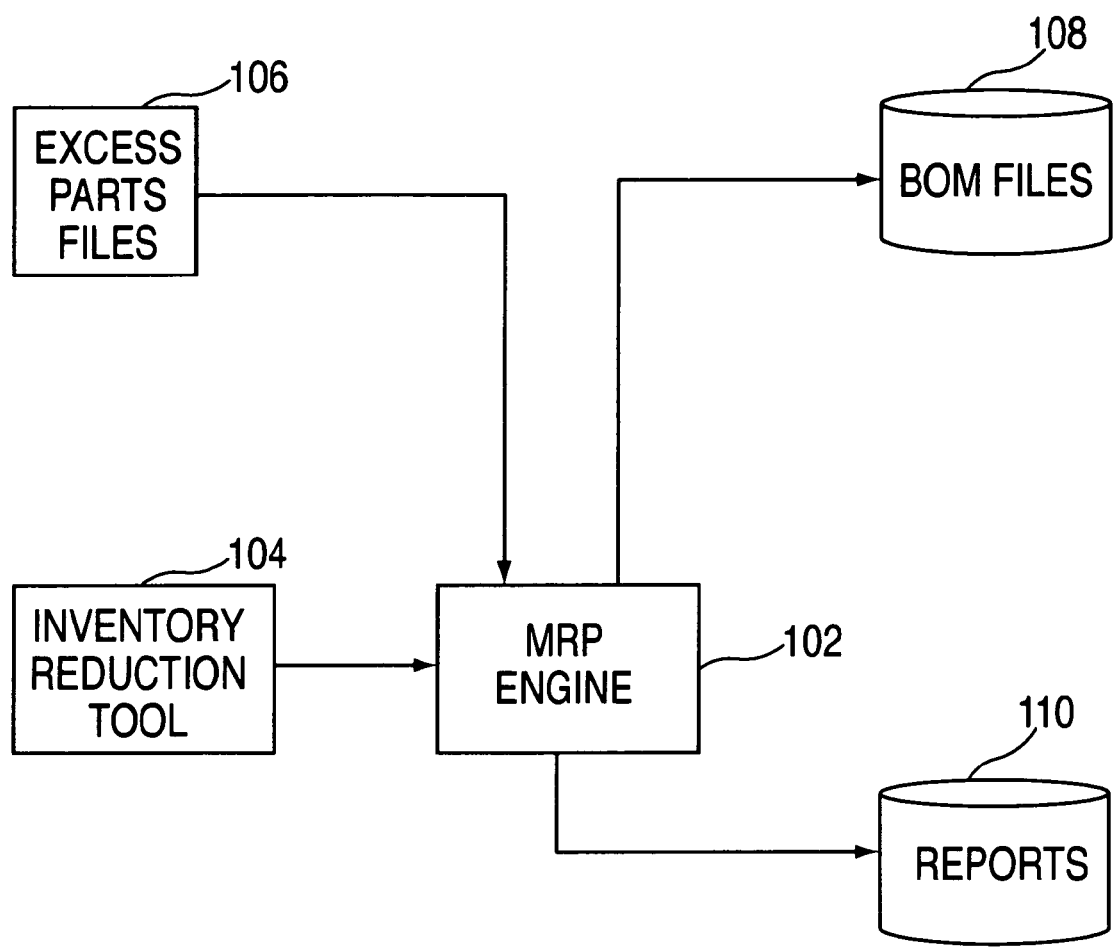
FIG. 1 is a block diagram of an exemplary system for facilitating excess/surplus inventory utilization.

FIG. 1 is a block diagram of an exemplary system for facilitating excess/surplus inventory utilization and management. Excess parts files (also referred to herein as excess inventory files) 106 are provided by manufacturing/inventory personnel and contain lists of any excess/surplus parts along with the quantity in excess. For simplicity, the term excess/surplus will be referred to herein as 'excess' and will be understood to include both excess and surplus throughout this description. These files 106 are submitted to a Manufacturing Resource Planning (MRP) engine 102 that utilizes the inventory reduction tool 104 of the invention. BOM files in database 108 are accessed and any items therein that are listed in excess parts files 106 are tagged by inventory reduction tool 104 via a shell script. This mark up process allows tagged BOMs to be submitted as build candidates as described herein. Output of this process is submitted to reports database 110 for analysis and review by specified inventory specialists (also referred to herein as inventory planners).

Figure 2:
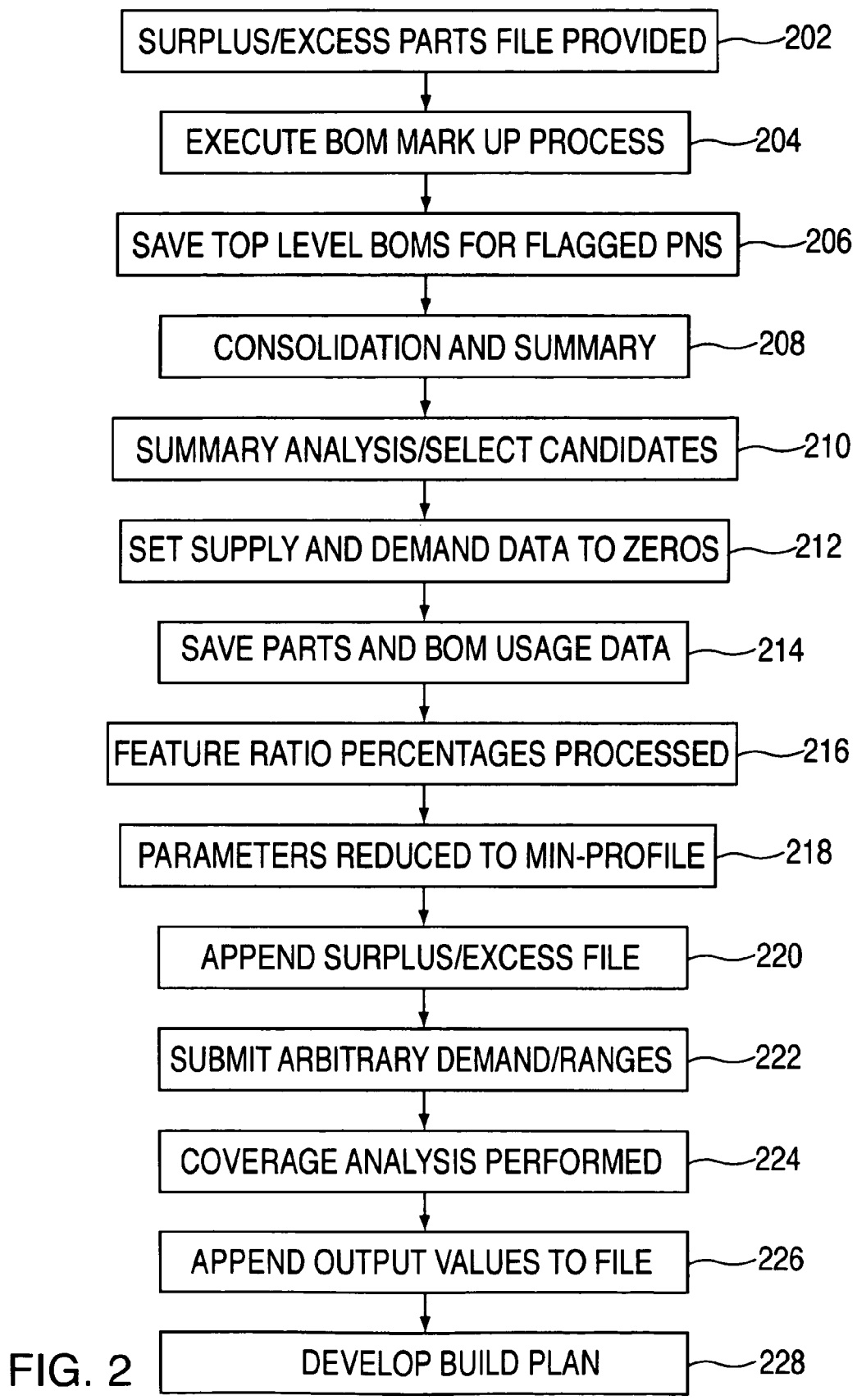
FIG. 2 is a flowchart of a process for assisting an inventory planner in determining an optimum build plan in an exemplary embodiment.

A method for determining an optimal build plan is presented as described in FIG. 2. A plant or division provides one or more files 106 of excess part numbers with the quantity of excess inventory at step 202. These are usually parts that have inventory but either there is no demand at all (surplus), or there is no current demand for some time in the future (excess). Once the excess file(s) 106 has been received, it can be run into a process to determine which end products uses the most number of surplus/excess parts. For example, suppose an excess file contains 5,000 part numbers. The file is run through a bill of material mark up process that takes end items (component part numbers) and marks them up through the entire bill of material, flagging every part number in the surplus/excess file that is found in the BOM at step 204. This mark-up may be run in a program script marking each surplus part number individually and then keeps the top level (end product) for each surplus/excess part for the next step at step 206. The surplus/excess part numbers are consolidated with their associated end products and a summary of end products listing the total number of surplus/excess part numbers in descending order is provided at step 208. A sample summary is provided below.

| End product 6 | 3000 part numbers |
| End product 3 | 2500 part numbers |
| End product 9 | 2300 part numbers |
| End product 7 | 1500 part numbers |
| End product 1 | 500 part numbers |
| End product 5 | 100 part numbers |

This summary is used by inventory planners in selecting an end product to be tested as a candidate for manufacture as described herein. Inventory planners examine the summary and select the appropriate candidates at step 210. In the above example, end product 6 may be selected first since it uses the most number of surplus/excess parts. Once the candidates are selected, they are submitted to the inventory reduction tool 104 which utilizes the existing MRP system 102 in the testing process. This can be accomplished using a shell script as provided in steps 212–228 as described herein. The existing supply and demand data fields for data currently held in the MRP system for all parts and end products are set to zero at step 212. The parts and BOM usage data are saved at step 214. The existing end product feature ratio percentages are used to drive the most popular mixes at step 216. All parameters are reduced to a MIN-profile at step 218. This may be accomplished using the method described in U.S. patent application Ser. No. 09/943,834, entitled, "Forecasting Demand for Critical Parts in a Product Line", filed on Aug. 31, 2001, by the assignee of the present invention and which is incorporated by reference herein in its entirety. The referenced invention can be used to remove various ordering parameters from MRP programs, such as explode, lead time, transit time, order sizing, etc., allowing for utilization of minimal required parameters that allow one to play 'what if' scenarios in order to gain understanding of demand changes and forecasting data.

The excess file 106 submitted to the inventory reduction tool 104 is appended at step 220 in order to establish the part numbers contained therein to be the only existing supply. The tool 104 submits an arbitrary demand to the MRP system 102 one end product at a time, with the quantity (i.e., demand for the end product) in the first time bucket at step 222. Second and third time buckets follow the first time bucket in a similar manner. This arbitrary demand may be a 'guess' used as a starting point and for use in zoning in an optimal quantity. The arbitrary demand is submitted by the tool 104 in ranges (e.g., 50, 100, 150), with the expectation that the outputs will eventually point out the most optimal quantity. A sample of inputs for end products 6, 3, and 9 are presented below.

| End product | Inputs |
|---|---|
| 6 | 50 |
|   | 100 |
|   | 150 |
| 3 | 50 |
|   | 100 |
|   | 150 |
| 9 | 50 |
|   | 100 |
|   | 150 |
| 7 | 50 |
|   | 100 |
|   | 150 |

The MRP engine 102 takes this information and performs coverage analysis against the arbitrary demand using the surplus/excess data as the only supply at step 224. Once this has been completed for each end product and range value, the tool 104 appends the output values to a file which will be used to calculate and develop a report at step 226. The output values include a list of surplus/excess parts which were consumed by that pass and the unit cost per part, as well as a list of all parts (including any additional surplus/excess parts) which need to be procured over and above the existing surplus/excess consumption and the unit cost for these. This report is used by the various inventory specialists in plants and divisions to determine what and how end products can be manufactured that use the most surplus/excess and require very little new buy activity. A plan can then be put in place to develop build plans to produce discount end products which are largely made up of surplus/excess inventory at step 228. A sample report is illustrated below.

| End product | Range | S/E $ Consumed | New Buy $ required |
|---|---|---|---|
| 6 | 50 | 50 M | 2 M |
| 6 | 100 | 100 M | 4 M |

-continued

| End product | Range | S/E $ Consumed | New Buy $ required |
|---|---|---|---|
| 6 | 150 | 125 M | 30 M |
| 3 | 50 | 35 M | 6 M |
| 3 | 100 | 60 M | 15 M |
| 3 | 150 | 61 M | 100 M |
| 9 | 50 | 15 M | 45 M |
| 9 | 100 | 20 M | 75 M |
| 9 | 150 | 20 M | 125 M |
| 7 | 50 | 10 M | 75 M |
| 7 | 100 | 20 M | 140 M |
| 7 | 150 | 25 M | 190 M |

By examining the above report, an inventory specialist can easily determine which end products and what quantity ranges would be best to use up surplus/excess dollars without requiring large additional expenditures.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be evident to those skilled in the art that the present invention provides many improvements over the current state of the art of ratio planning. Data from a variety of systems and locations is being collected into a single database in order to provide a single, integrated repository for ratio planning data. The invention allows ratio planners to catalogue part numbers and models in order to provide some structure and meaning to the thousands of seemingly random part numbers. The cataloging provides an easy way to pull information together for reports. Additionally, the invention provides the ability, through the use of pre-defined reports, to generate reports very quickly and with a minimum of computer database expertise on the part of the ratio planner. The invention is well suited for both small manufacturers with relatively few ratios as well as very large manufacturers with tens of thousands of ratios.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method for utilizing excess inventory of parts, said parts used in end products and having part numbers, the method comprising:

determining a summary of at least one end product utilizing at least one excess part number, said summary including a total quantity of said at least one excess part number required to produce respective said at least one end product; and based on a selection of at least one end product from said summary and at least one corresponding quantity, generating a report of end products that, for each quantity of at least one end product, lists:

the dollar value or excess parts consumed to produce said quantity of end product; and the dollar value of additional parts to be purchased to produce said quantity of end product, wherein said determining a summary of at least one end product includes submitting an excess inventory file to a Manufacturing Resource Planning (MRP) engine, said excess inventory file containing part numbers and corresponding quantities of excess parts held in inventory; and wherein said generating a report of end products includes:

submitting arbitrary demand values to said MRP engine one end product at a time until said arbitrary demand values point out a most optimal quantity, the most optimal quantity specifying a quantity of end products determined to consume the greatest number of excess parts without requiring additional expenditures; and performing coverage analysis against said arbitrary demand values using said excess inventory file as existing supply.

2. The method of claim 1, wherein said determining a summary of at least one end product further includes executing a BOM mark up process, comprising:

tagging part numbers listed in BOM files corresponding to said part numbers provided in said excess inventory file; and consolidating tagged part numbers according to corresponding end products and entering resulting data into said summary.

3. The method of claim 1, wherein said generating a report of end products further includes:

setting existing supply and demand data for all part numbers and end products to zeros, said data held in said MRP engine;

retaining existing parts data and usage data;

applying existing end product feature ratio percentages operable for driving optimum mixes;

reducing parameters to a minimum profile value; and appending said excess inventory file to supply data fields.

4. The method of claim 1, wherein said submitting arbitrary demand values to said MRP engine includes:

submitting a first quantity in a first time bucket;

submitting a second quantity in a second time bucket; and submitting a third quantity in a third time bucket;

said performing coverage analysis includes performing said coverage analysis on each of said values using said excess inventory file as said existing supply;

wherein said generating a report end products further includes:

appending output values to a file resulting in said report, said output values including:

a list of excess parts consumed during said coverage analysis and a unit cost per part; and a list of additional parts needed and a unit cost per part; and developing a build plan according to said output values contained in said report.

5. The method of claim 4, wherein said build plan is used to produce discount end products.

6. The method of claim 1, wherein said summary provides a listing of end products sorted in descending order.

7. A storage medium encoded with machine readable computer program code for utilizing excess inventory, the storage medium including instructions for causing a computer to implement a method comprising:

determining a summary of at least one end product utilizing at least one excess part number, said summary including a total quantity of said at least one excess part number required to produce respective said at least one end product; and based on a selection of at least one end product from said summary and at least one corresponding quantity, generating a report of end products that, for each quantity of at least one end product, lists:

the dollar value of excess parts consumed to produce said quantity of end product; and the dollar value of additional parts to be purchased to produce said quantity of end product, wherein said determining a summary of at least one end product includes submitting an excess inventory file to a Manufacturing Resource Planning (MRP) engine, said excess inventory file containing part numbers and corresponding quantities of excess parts held in inventory; and wherein said generating a report of end products includes:

submitting arbitrary demand values to said MRP engine one end product at a time until said arbitrary demand values point out a most optimal quantity, the most optimal quantity specifying a quantity of end products determined to consume the greatest quantity excess parts without requiring additional expenditures; and performing coverage analysis against said arbitrary demand values using said excess inventory file as existing supply.

8. The storage medium of claim 7, wherein said determining a summary of at least one end product further includes executing a BOM mark up process, comprising:

tagging pan numbers listed in BOM files corresponding to said part numbers provided in said excess inventory file; and consolidating tagged part numbers according to corresponding end products and entering resulting data into said summary.

9. The storage medium of claim 7, wherein said generating a report of end products further includes:

setting existing supply and demand data for all part numbers and end products to zeros, said data held in said MRP engine;

retaining existing parts data and usage data;

applying existing end product feature ratio percentages operable for driving optimum mixes;

reducing parameters to a minimum profile value; and appending said excess inventory file to supply data fields.

10. The storage medium of claim 7, wherein said submitting arbitrary demand values to said MRP engine includes:

submitting a first quantity in a first time bucket;

submitting a second quantity in a second time bucket; and submitting a third quantity in a third time bucket;

said performing coverage analysis includes performing said coverage analysis on each of said values using said excess inventory file as existing supply;

said generating a report of end products further includes:

appending output values to a file resulting in said report, said output values including:

a list of excess parts consumed during said coverage analysis and a unit cost per part; and a list of additional parts needed and a unit cost per part; and developing a build plan according to said output values contained in said report.

11. The storage medium of claim 10, wherein said build plan is used to produce discount end products.

12. The storage medium of claim 7, wherein said summary provides a listing of end products sorted in descending order.

13. A system for utilizing excess inventory, comprising:

a Manufacture Resource Engine (MRP) engine;

an inventory reduction tool accessible to said MRP engine;

at least one excess inventory file containing part numbers and corresponding quantities of excess parts held in inventory;

a database of bills of material files; and a report database;

wherein upon submitting said at least one excess inventory file to said MRP engine, said inventory reduction tool identifies end products utilizing excess parts via a bill of material mark up process, and tests end product candidates identified as using desired quantities of said excess parts;

wherein said end product candidates are tested via:

submitting arbitrary demand values to said MRP engine one end product at a time until said arbitrary demand values point out a most optimal quantity, the most optimal quantity specifying a quantity of end products determined to consume the greatest quantity of excess parts without requiring additional expenditures; and performing coverage analysis against said arbitrary demand values using said at least one excess inventory file as existing supply.

14. The system of claim 13, wherein said end product candidates are further tested via:

setting existing supply and demand data for all part numbers and end products to zeros, said data held in said MRP engine;

retaining existing parts data and usage data;

applying existing end product feature ratio percentages operable for driving optimum mixes;

reducing parameters to a minimum profile value; and appending said excess inventory file to supply data fields.

15. The system of claim 13, wherein said submitting arbitrary demand values to said MRP engine includes:

submitting a first quantity in a first time bucket;

submitting a second quantity in a second time bucket; and submitting a third quantity in a third time bucket;

said performing coverage analysis includes performing said coverage analysis on each of said values using said excess inventory file data as existing supply;

said end product candidates are further tested via:

appending output values to a file resulting in said report, said output values including:

a list of excess parts consumed during said coverage analysis and a unit cost per part; and a list of additional parts needed and a unit cost per part; and developing an optimal build plan according to said output values contained in said report.

16. The system of claim 15, wherein said optimal build plan is determined by identifying which end products, if produced, will consume a greatest quantity of excess parts while requiring minimal additional expenditure for additional parts.

17. The system of claim 15, wherein said optimal build plan is used to produce discount end products.

* * * * *